United States Patent Office 3,127,792
Patented Apr. 7, 1964

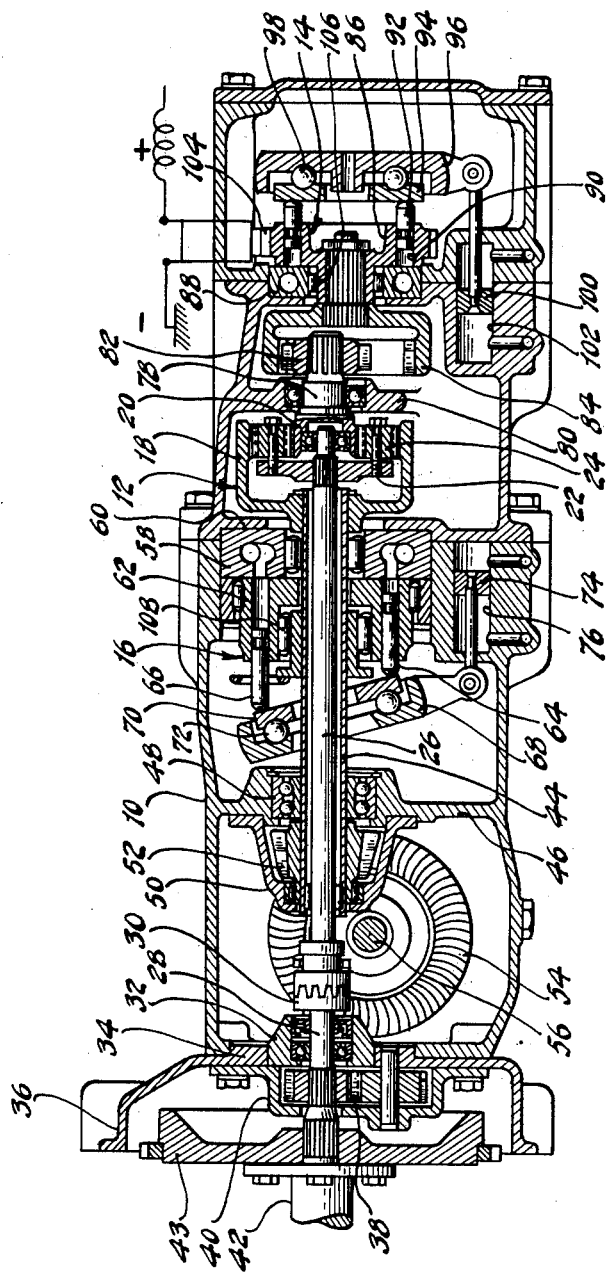

3,127,792
HYDROSTATIC-MECHANICAL POWER
TRANSMISSION MECHANISM
Alexander Balbaschewski, Cologne, Germany, assignor to Ford Motor Company, Dearborn, Mich., a corporation of Delaware
Filed Dec. 7, 1960, Ser. No. 74,423
Claims priority, application Germany Dec. 8, 1959
13 Claims. (Cl. 74—687)

My invention relates generally to a new and improved power transmission mechanism having infinitely variable torque ratio characteristics. It is particularly adapted to be used in the power train of an engine powered road vehicle. More particularly, my invention relates to a power transmission mechanism that employs hydrostatic pump and motor units and planetary gearing for torque transmitting purposes, the hydrostatic units and the gearing cooperating to provide two torque delivery paths.

One of the two torque delivery paths is utilized when the vehicle is accelerated and it is comprised partly of the hydrostatic units and partly of the gearing. A portion of the total torque is accommodated by the hydrostatic units and the remaining portion of the torque is accommodated by the gearing. During operation of the vehicle under steady state road load conditions, only a single torque delivery path is utilized, and this is wholly mechanical in character.

The provision of a power transmitting mechanism of the type above described being a principal object of my invention, it is a further object of my invention to provide a power transmission mechanism having hydrostatic pump and motor units situated in a closed hydraulic circuit and adapted to transfer a portion of the driving torque from the driving member to the driven member while the remaining portion of the torque is transferred mechanically from the driving member to the driven member. Provision is made also for rendering the hydrostatic pump and motor units inoperative during steady state road load driving conditions.

It is another object of my invention to provide a power transmission mechanism having infinitely variable torque ratio characteristics for purposes of acceleration, and which is further characterized by a relatively high degree of mechanical efficiency when the road load torque requirements are of a reduced order of magnitude.

It is a further object of my invention to provide a power transmission mechanism of the type above set forth wherein the planetary gearing and the hydrostatic pump and motor units are situated in concentric disposition with respect to the power input shaft and the power output shaft.

It is a further object of my invention to provide a power transmission mechanism of the above type set forth wherein the power output shaft is drivably connected to a driven shaft arranged transversely with respect to the axis of the power input and power output shafts, suitable right angle drive gearing being provided for this purpose.

In carrying forth the foregoing objects, I have provided a simple planetary gear unit having one element drivably connected to a power input shaft and a second element drivably connected to a power output shaft, the latter being in the form of a sleeve rotatably journaled about the power input shaft. The mechanism further includes a hydrostatic pump that is drivably connected to the reaction member of the planetary gear unit, and this hydrostatic pump is hydraulically connected to the hydrostatic motor by means of a closed hydraulic circuit. The motor in turn is coupled to the sleeve by means of an overrunning coupling.

The degree of reaction provided by the reaction element of the planetary gear unit can be varied by controlling the displacement of the hydrostatic pump, and when displacement of the hydrostatic motor is suitably adjusted, feedback torque is transferred through the overrunning coupling to the sleeve to supplement the torque being distributed through the gear unit.

The over-all torque ratio of the mechanism can be varied from a maximum to a minimum value by appropriately controlling the displacement of the pump and motor units. Suitable control servos are provided for this purpose.

When the minimum torque ratio is produced, provision is made for anchoring the reaction member of the planetary gear unit and for rendering the hydrostatic pump unit inoperative. Under these conditions the hydrostatic motor unit is also rendered inoperative since the overrunning coupling between the rotor of the hydrostatic motor interrupts the driving connection between the motor and the sleeve. The over-all operating efficiency under these conditions is relatively high since the hydrostatic pump and motor units are inactive.

For the purpose of more particularly describing my invention, reference will be made to the accompanying drawing wherein numeral 10 designates a transmission housing that is common to the planetary gearing and the hydrostatic pump and motor units. The planetary gearing is generally designated in the drawing by numeral 12, the hydrostatic pump unit is generally designated by numeral 14 and the hydrostatic motor unit is generally designated by numeral 16.

The planetary gear unit comprises a ring gear 18, a sun gear 20, a carrier 22 and planet pinions 24, said pinions being rotatably journaled on carrier 22 and situated in meshing engagement with the ring gear 18 and the sun gear 20. Carrier 22 is splined positively or otherwise secured to a power input shaft 26 which extends longitudinally in coaxial relationship with respect to the planetary gearing 12.

Power input shaft 26 is adapted to be connected to shaft 28 by means of a dog clutch 30. The clutch 30 includes a clutch element that can be actuated longitudinally with respect to the shaft 26 by a suitable operator controlled linkage. It may thereby be adapted to be drivably engaged or disengaged. A cooperating element is carried by shaft 28. A bearing retainer 32 is positioned in a forward wall 34 which in turn is secured to one end of the housing 10. Wall 34 forms a part of a bell housing 36 which may be bolted or otherwise secured to the engine block for the internal combustion vehicle engine. Bearing retainer 32 houses suitable bearings which are adapted to journal shaft 28.

A positive displacement gear pump is shown generally at 38 and it includes a gear that is splined or otherwise connected to shaft 28. Pump 38 is retained within a pump cover 40 which in turn is secured to the interior of bell housing 36.

A vehicle engine crankshaft is shown at 42 and it carries flywheel 43. The flywheel 43 is connected to shaft 28 as indicated.

Ring gear 18 of the planetary gear unit 12 is connected to a sleeve shaft 44 concentrically journaled about shaft 26. Housing 10 includes a wall 46 which forms a bearing support for bearing 48, the latter in turn rotatably supporting the sleeve shaft 44.

A pinion housing 50 is connected to wall 46, and it encloses a bevel pinion 52. Pinion 52 in turn engages a bevel ring gear 54 connected to axle shaft 56, the latter extending transversely through housing 10 at a right angle with respect to the shaft 26.

The motor unit 16 comprises a body 58 secured to an internal wall 60 that forms a part of the casing 10. A rotor 62 is journaled adjacent body 58, and its axis of rotation coincides with the axis for shaft 26. Rotor 62 is formed with a plurality of angularly spaced cylinders 64 within which are positioned piston elements 66. A swash plate 68 is journaled for oscillation about a trunnion axis that is perpendicular to the axis for shaft 26 and it comprises a bearing plate 70 that is rotatably supported by ball bearings 72. Bearing plate 70 engages the extended end of piston elements 66 and when it is positioned at an angle, as illustrated in the drawing, the piston elements 66 will reciprocate in an axial direction within cylinders 64 when the rotor 62 is rotated about its axis.

The swash plate 68 is connected to a piston 74 situated within a fluid pressure cylinder 76, a suitable linkage being provided between the piston 74 and the swash plate 68. The piston elements 66 are defined by a portion of the housing 10.

Sun gear 20 is connected to shaft 78 which in turn is journaled within a bearing support 80 by a suitable bearing, said bearing support 80 comprising a part of housing 10. Shaft 78 is positively connected to an external pinion 82 that is situated in driving engagement with an internal ring gear 84, the latter being connected to a motor rotor 86 by means of a cooperating externally splined connecting shaft. Rotor 86 is journaled for rotation within body 88 which is secured to and supported by a wall that forms a part of housing 10. Rotor 86 is formed with a plurality of axially positioned cylinders 90 within which are situated piston elements 92. Piston elements 92 engage a bearing plate 94 that forms a part of a swash plate 96. Bearing plate 94 is supported by ball bearings 98.

Swash plate 96 is connected to piston element 100. The piston element 100 is linked to swash plate 96 as indicated and it is disposed in a cylinder 102 formed in housing 10.

The angularity of the swash plate 96 can be adjusted by appropriately distributing fluid pressure to one side of piston 100 or the other. In a similar fashion, the angularity of the swash plate 98 can be adjusted by appropriately distributing fluid pressure to either side of piston 74.

The body 58 of the motor unit 60 and the body 88 of pump unit 14 are suitably ported and are in fluid communication with each other so that the discharge side for one unit is hydraulically connected to the intake side for the other, and vice versa.

Rotor 86 is formed with external teeth which may be engaged by a solenoid operated pawl 104. The pawl 104 is actuated by means of an electrical solenoid, and the circuit for the solenoid can be opened and closed by means of a switch which is suitably connected to the engine carburetor linkage so that it can be opened when the vehicle operator advances the throttle setting to an advanced position. During acceleration, therefore, the pawl 104 is normally disengaged from the rotor 86.

Numeral 106 designates rollers which provide a one-way overrunning connection between the rotor 86 and the stationary body 88. The rotor 62 for the motor unit 16 is connected through sleeve shaft 44 to an overrunning clutch generally designated by numeral 108. This clutch is capable of transferring driving torque to sleeve shaft 44 in one direction but it will not allow the shaft 44 to transfer torque to the motor in the opposite direction.

During acceleration of the vehicle, the clutch 30 acts as a neutral clutch and it is in the engaged position shown in the drawing. Input torque is therefore delivered to carrier 22 of the planetary gearing 12. The swash plate for the hydrostatic motor 16 is adjusted to a maximum displacement position, and the swash plate for the hydrostatic pump 14 is placed at a zero displacement position. The displacement of the pump 14 is gradually increased by appropriately pressurizing the cylinder 102, and the sun gear 20 thereby provides a limited degree of torque reaction since it is drivably connected to the rotor for the hydrostatic pump unit 14.

Since the pump 14 and motor 16 are hydraulically connected, the motor 16 is driven. The torque acting on the motor 16 is transferred to sleeve 44 through clutch 108. It is therefore apparent that a portion of the driving torque will be transferred hydraulically through the hydrostatic units to the sleeve shaft 44 while the remainder is transferred directly through the gearing.

To increase the speed of the sleeve shaft 44 relative to the engine speed, the displacement of the hydraulic pump unit 14 is increased thereby increasing the degree of reaction provided by the sun gear 20. The motor unit 16 continues to drive the sleeve shaft 44 through the overrunning clutch 108, although the percentage of total torque transferred hydraulically through the hydraulic units increases when the degree of reaction provided by the sun gear 20 is increased in this fashion.

To increase the driven speed of the sleeve shaft 44 still further, the displacement of motor unit 16 is decreased by appropriately pressurizing the cylinder 76.

This action will continue until the speed of the pump unit 14 becomes zero. Coupling 106 will prevent a reverse rotation of the pump unit 14. At this time the engine torque demand is reduced and the engine carburetor throttle setting is correspondingly decreased. The solenoid circuit for the pawl 104 is interrupted as previously explained thereby allowing pawl 104 to engage the teeth formed on the periphery of the rotor 86. When this occurs, sun gear 14 is anchored to the housing and is held stationary. The hydraulic units are inoperative under these conditions and the planetary gearing is the sole torque transferring means between shaft 26 and shaft 44. Under these conditions the over-all operating efficiency is relatively high since the losses normally associated with hydraulic units of this type are not present.

If the vehicle engine speed should be increased to a relatively high value after the pawl 104 becomes engaged, the overrunning clutch 108 will permit sleeve shaft 44 to overrun the rotor 62 for the hydraulic motor 16. Because of this action the rotor 62 will not be carried along with the shaft 44, and the losses normally associated with fluid circulation through the closed hydraulic circuit under zero torque conditions are not present.

Having thus described a preferred embodiment of my invention, what I claim and desire to secure by United States Letters Patent is:

1. A power transmission mechanism for delivering driving torque from a driving member to a driven member comprising a planetary gear unit, said planetary gear unit including a sun gear member, a ring gear member, a carrier member and planetary gears rotatably mounted on said carrier member in driving engagement with said sun gear member and said ring gear member, said carrier member being connected to said driving member, a hydrostatic pump unit, a hydrostatic motor unit, said hydrostatic units being disposed in a common, closed hydraulic circuit whereby one unit drives the other, means for drivably connecting said sun gear member to said pump unit, overrunning clutch means for establishing a one-way driving connection between said motor unit and said ring gear member, a connection between said driven member and said ring gear member, means for varying the displacement of said motor unit, means for varying the displacement of said pump unit, and brake means for anchoring said pump unit during high speed operation of said mechanism.

2. In a power transmission mechanism for delivering driving torque from a driving member to a driven member, a planetary gear unit including a ring gear member, a sun gear member, a carrier member, and planetary gears rotatably mounted on said carrier member in driving engagement with said sun and ring gear members, a first member of said planetary gear unit being connected to said driving member, means for connecting a second member of said planetary gear unit to said driven member, a first hydrostatic unit, a second hydrostatic unit, means for drivably connecting the third member of said planetary gear unit to said first hydrostatic unit, overrunning clutch means for establishing a driving connection between said second hydrostatic unit and said driven member, means for varying the displacement of said first hydrostatic unit, means for varying the displacement of said second hydrostatic unit, and brake means for selectively braking said first hydrostatic unit during high speed operation, said hydrostatic units being disposed in a closed hydraulic circuit whereby one hydrostatic unit will drive the other.

3. In a power transmission mechanism for delivering driving torque from a driving member to a driven member, said driving member being connected to a power source, a planetary gear unit, said planetary gear unit including a sun gear member, a ring gear member, a carrier member and planetary gears rotatably mounted on said carrier member in driving engagement with said sun gear member and said ring gear member, said carrier member being connected to said driving member, a hydrostatic pump unit, a hydrostatic motor unit, said hydrostatic units being disposed in a common hydraulic circuit whereby one unit will drive the other, means for drivably connecting said sun gear member to said pump unit, overrunning clutch means for drivably connecting said motor unit to said ring gear member, a driving connection between said driven member and said ring gear member, means for varying the displacement of said motor unit, means for varying the displacement of said pump unit, brake means for anchoring said pump unit during high speed operation of said mechanism, said driving member and said driven member being situated in concentric relationship, said driven member being in the form of a sleeve shaft journaled for rotation about the axis of said driving member, and a power output driving pinion carried by said sleeve shaft, said planetary gear unit being located on one side of said power output pinion and said power source being located on the other side thereof, the axis of said power output pinion being common to said power input shaft and said planetary gear unit.

4. In a power transmission mechanism for delivering power from a driving member to a driven member, a planetary gear unit, said planetary gear unit including a ring gear member, a sun gear member, a carrier member, and planetary gears rotatably mounted on said carrier member in driving engagement with said sun gear member and said ring gear member, said carrier member being connected to said driving member, said ring gear member being connected to said driven member, a first hydrostatic unit concentrically positioned with respect to said driving member, a second hydrostatic unit concentrically mounted with respect to said driven member, a geared connection between said sun gear member and said first hydrostatic unit, overrunning clutch means for establishing a one-way driving connection between said ring gear member and said second hydrostatic unit, said hydrostatic units being situated in a closed hydraulic circuit whereby one unit will drive the other, and means for varying the displacement of each of said hydrostatic units.

5. In a power transmission mechanism for delivering power from a driving shaft to a driven shaft, said driving shaft being concentrically disposed within said driven shaft, a planetary gear unit comprising a sun gear member, a ring gear member, a carrier member, and planetary gears rotatably mounted on said carrier member in meshing engagement with said sun gear member and said ring gear member, said driving shaft being connected to a power input member of said gear unit, a first hydrostatic unit and a second hydrostatic unit situated in a closed hydraulic circuit, a geared connection between a reaction member of said gear unit and said first hydrostatic unit, a power output member of said gear unit being connected to said driven shaft, overrunning clutch means for establishing a one-way driving connection between said power ouput gear member and said second hydrostatic unit, and means for adjusting the relative displacement of said hydrostatic units whereby the effective speed ratio of said planetary gear unit can be varied as desired.

6. In a power transmission mechanism for delivering power from a driving shaft to a driven shaft, said driving shaft being concentrically disposed within said driven shaft, a planetary gear unit comprising a sun gear member, a ring gear member, a carrier member, and planetary gears rotatably mounted on said carrier member in meshing engagement with said sun gear member and said ring gear member, said driving shaft being connected to a power input member of said gear unit, a first hydrostatic unit and a second hydrostatic unit situated in a closed hydraulic circuit, a geared connection between reaction member of said gear unit and said first hydrostatic unit, a power output member of said gear unit being connected to said driven shaft, overrunning clutch means for establishing a one-way driving connection between said second hydrostatic and said power output shaft, means for adjusting the relative displacement of said hydrostatic units whereby the effective speed ratio of said planetary gear units can be varied as desired, and brake means for selectively anchoring said first hydrostatic unit to render the same inoperative.

7. In a power transmission mechanism for delivering power from a driving member to a driven member, a planetary gear unit including a sun gear member, a ring gear member, a carrier member, planet gears journaled on said carrier member in meshing engagement with said sun and ring gear members, said driving member being connected to a first member of said gear unit, said driven member being connected to a second member of said gear unit, a first hydrostatic unit and a second hydrostatic unit situated in a closed hydraulic circuit whereby one unit may drive the other, a third member of said gear unit being drivably connected to said first hydrostatic unit, overrunning clutch means for establishing a one-way driving connection between said second hydrostatic unit and said driven member, means for adjusting the relative displacement of said hydrostatic units, and an overrunning brake means for inhibiting rotation of said first hydrostatic unit in one direction while accommodating rotation thereof in the opposite direction.

8. In a power transmission mechanism for delivering power from a driving member to a driven member, a planetary gear unit including a sun gear member, a ring gear member, a carrier member, planet gears journaled on said carrier member in meshing engagement with said sun and ring gear members, said driving member being connected to a first member of said gear unit, said driven member being connected to a second member of said gear unit, a first hydrostatic unit and a second hydrostatic unit situated in a closed hydraulic circuit whereby one unit may drive the other, a third member of said gear unit being drivably connected to said first hydrostatic unit, overrunning clutch means for establishing a one-way driving connection between said second hydrostatic unit and said driven member, means for adjusting the relative displacement of said hydrostatic units, an overrunning brake means for inhibiting rotation of said first hydrostatic unit in one direction while accommodating rotation thereof in the opposite direction, and selectively operable positive brake means for overruling said overrunning brake means to inhibit rotation of said first hydrostatic unit in either direction.

9. A power transmission mechanism for delivering driving torque from a driving member to a driven member comprising a planetary gear unit, said planetary gear unit including a sun gear member, a ring gear member, a carrier member and planetary gears rotatably mounted on said carrier member in driving engagement with said sun gear member and said ring gear member, said carrier member being connected to said driving member, first and second hydrostatic units disposed in a closed hydraulic circuit whereby one hydrostatic unit will drive the other, means for drivably connecting said sun gear member to said first unit, clutch means for drivably connecting said second unit to said ring gear member, a connection between said driven member and said ring gear member, means for varying the relative displacements of said hydrostatic units, and brake means for anchoring said first unit during high speed operation of said mechanism.

10. In a power transmission mechanism for delivering driving torque from a driving member to a driven member, a planetary gear unit including a ring gear member, a sun gear member, a carrier member, and planetary gears rotatably mounted on said carrier member in driving engagement with said sun and ring gear members, a first member of said planetary gear unit being connected to said driving member, means for connecting a second member of said planetary gear unit to said driven member, a first hydrostatic unit, a second hydrostatic unit, means for drivably connecting the third member of said planetary gear unit to said first hydrostatic unit, clutch means for drivably connecting said second hydrostatic unit to said driven member, means for varying the relative displacements of said hydrostatic units, and brake means for braking said first hydrostatic unit during high speed operation, said hydrostatic units being disposed in a closed hydraulic circuit whereby one hydrostatic unit will drive the other.

11. In a power transmission mechanism for delivering driving torque from a driving member to a driven member, said driving member being connected to a power source, a planetary gear unit, said planetary gear unit including a sun gear member, a carrier member and planetary gears rotatably mounted on said carrier member in driving engagement with said sun gear member and said ring gear member, said carrier member being connected to said driving member, first and second hydrostatic units disposed in a closed hydraulic circuit whereby one unit will drive the other, means for drivably connecting said sun gear member to said first unit, means for drivably connecting said second unit to said ring gear member, a driving connection between said driven member and said ring gear member, means for varying the relative displacements of said hydrostatic units, brake means for anchoring said first unit during high speed operation of said mechanism, said driving member and said driven member being situated in concentric relationship, said driven member being in the form of a sleeve shaft journaled for rotation about the axis of said driving member, and a power output driving pinion carried by said sleeve shaft, said planetary gear unit being located on one side of said power output pinion and said power source being located on the other side thereof, the axis of said power output pinion being common to said power input shaft and said planetary gear unit.

12. In a power transmission mechanism for delivering power from a driving member to a driven member, a planetary gear unit, said planetary gear unit including a ring gear member, a sun gear member, a carrier member, and planetary gears rotatably mounted on said carrier member in driving engagement with said sun gear member and said ring gear member, said carrier member being connected to said driving member, said ring gear member being connected to said driven member, a first hydrostatic unit concentrically positioned with respect to said driving member, a second hydrostatic unit concentrically mounted with respect to said driven member, a geared connection between said sun gear member and said first hydrostatic unit, clutch means for clutching said ring gear member to said second hydrostatic unit, said hydrostatic units being situated in a closed hydraulic circuit whereby one unit will drive the other, and means for varying the displacement of each of said hydrostatic units.

13. An infinitely variable power transmission mechanism for transmitting power from a driving shaft to a driven shaft, an epicyclic gear unit comprising a power input member, a power output member and a reaction member, said driven shaft being connected to said power output member, said driving shaft being connected to said power input member, first and second hydrostatic units disposed in a common, closed hydrostatic circuit whereby one hydrostatic unit is adapted to drive the other, said driven shaft being in the form of a sleeve, said driving shaft being disposed concentrically within said sleeve, the power output member and the reaction member of said gear unit being connected drivably to said first and second hydrostatic units respectively, the driving connection between said first hydrostatic unit and said power output member of said gear unit including a torque delivery clutch, means for varying the relative displacements of said hydrostatic units, and brake means for anchoring said reaction member of said gear unit to establish a fully mechanical torque delivery path between said driving shaft and said driven shaft.

References Cited in the file of this patent
UNITED STATES PATENTS

| | | |
|---|---|---|
| 1,855,222 | Chase | Apr. 26, 1932 |
| 2,599,814 | Cull | June 10, 1952 |
| 2,994,233 | Gerard | Aug. 1, 1961 |